United States Patent [19]
Michael

[11] 3,784,889
[45] Jan. 8, 1974

[54] MOTORIZED CONTROL ROD DRIVE

[75] Inventor: Ulrich Michael, Erlangen, Germany

[73] Assignee: Siemens Aktiengesellschaft, Berlin Germany

[22] Filed: Oct. 1, 1970

[21] Appl. No.: 77,097

Related U.S. Application Data

[63] Continuation-in-part of Ser. No. 870,575, Nov. 20, 1969, abandoned.

[30] Foreign Application Priority Data

Oct. 4, 1969 Germany.................. P 18 09 845.8

[52] U.S. Cl.................. 318/171, 310/83, 318/372, 318/696
[51] Int. Cl. ............................................ H02p 1/52
[58] Field of Search..................... 310/83; 318/171, 318/696, 160, 372

[56] References Cited
UNITED STATES PATENTS

| | | |
|---|---|---|
| 1,937,929 | 12/1933 | Williams et al. ................ 318/160 X |
| 3,264,502 | 8/1966 | Lytle et al........................ 310/83 X |
| 3,206,664 | 9/1965 | Lilly.............................. 318/171 X |
| 3,152,960 | 10/1964 | Alfred............................ 310/83 X |
| 2,961,589 | 11/1960 | Ghalib et al. ...................... 318/171 |
| 2,945,997 | 7/1960 | Kennedy......................... 318/171 X |

*Primary Examiner*—T. E. Lynch
*Attorney*—Curt M. Avery, Arthur E. Wilfond, Herbert L. Lerner and Daniel J. Tick

[57] ABSTRACT

A variable speed drive for nuclear reactor control rods includes a synchronous motor having a permanent magnet rotor and stator pole windings, and means for selectively connecting the stator pole windings to a multiphase rotating current source for relatively rapidly moving the control rod and to a direct current source for stepwise and relatively slowly moving the control rod, the stator pole windings being connectible to the direct current source by the connecting means in a selective sequence and direction and at a selective winding-switching frequency. A blocking device prevents inadvertent upward travel of the control rods at the rapid operating speed.

3 Claims, 3 Drawing Figures

REACTOR CORE

MOTORIZED CONTROL ROD DRIVE

This is a continuation-in-part of my application Ser. No. 870,575, now abandoned filed under the same title on Nov. 20, 1969 and claiming a right of priority based upon a German patent application filed abroad Nov. 20, 1968. A right of priority is also based upon an application filed in Germany on Oct. 4, 1969.

My invention relates to motorized variable speed drive for nuclear reactor control rods.

Motorized drive mechanisms per se are known, and it is also known to vary the rotary speed of such drive motors by varying the supply current thereto. However the technical cost thereof is relatively great.

Normally, two different speeds are sufficient; namely a slow speed for the usual adjustment of the control rods and a fast speed for scramming the control rods and rapidly decreasing the power output of a nuclear reactor or shutting off the reactor completely. For this purpose, for example, a pole-switching motor could be used. When the motor is switched-off after either operating speed, however, the rotor continues to turn for quite a while so that very small measurable changes in position of the control rods are not possible to a reproducible accuracy of about 1 percent. In either case, an auxiliary mechanical or electrical braking system would be required, especially to maintain the rotor in the position thereof if the weight of the control rod exerted a turning moment (torque) on the shaft of the switched-off motor.

It is accordingly an object of my invention to provide motorized control rod drive which avoids the foregoing disadvantages of conventional drives of this general type. More specifically, objects of my invention are to provide such a motorized control drive which is technically simple, which will permit highly accurate and reproducible changes in position of the control rods being driven, and which will not require any brakes per se.

Another object of my invention is to improve the reliability of performance toward greater safety of nuclear reactor operation. For such operation the avoidance of hazards is of utmost importance. In this respect the control rod drive mechanism must meet most exacting requirements. For example, it must not be possible for the regulator rods to be inadvertently or accidentally moved out of the reactor core under the effect of hydraulic forces. Hence in a drive system employed according to my invention, care must be taken that, during rapid operation by multiphase excitation of the motor, a rapid outward movement of the regulator rods is prevented even if the phases are erroneously or accidentally reversed.

It is therefore another object of my invention to positively exclude any rapid withdrawal of the regulator rods due to inadvertence or due to faults occurring in the electrical system.

With the foregoing and other objects in view, I provide, in accordance with my invention, motorized variable speed drive for nuclear reactor control rod comprising a synchronous motor having a rotor with unidirectional field excitation means, preferably a permanent magnet rotor and stator pole windings, and means for selectively connecting the stator pole windings to a multiphase current source for relatively rapidly moving the control rod and to a direct current source for stepwise and relatively slowly moving the control rod, the stator pole windings being connectible to the direct current source by the connecting means in a selective sequence and direction and at a selective winding-switching frequency.

In accordance with another feature of my invention in a rest position of the control rod, at least one of the stator pole windings is always connected by the connecting means to the direct current source and is traversed by direct current.

According to still another feature of my invention, I provide the rod drive with a detent or the like blocking mechanism whose engagement with the rod driving mechanism of the system is electromagnetically interrupted for a short interval of time during each switching of the direct-current excitation of the drive motor. Since a downward travel of the rods is always in the shut-down direction of the nuclear reactor, no blocking device is needed with respect to this direction of rod travel. With a phase-correct supply of multiphase current, only a downward movement of the regulator rods will occur. No rapid outward travel of the rods is provided for, and none would be permissible for safety reasons. When for downward or inward movement of the regulator rods a corresponding supply of the motor with direct-current pulses takes place, the blocking mechanism remains in blocking engagement and then prevents a hydraulic lifting of the rods in the event the spindle and driving nut are not self-blocking.

According to still another feature of my invention, I provide a suitably connected contactor for switching the motor from direct to multiphase excitation of the stator windings, thus taking care that with multiphase excitation a magnetic unblocking by interruption of the current supply is prevented so that, even in the event of a possible although improbable faulty reversal of the phases, a rapid rotation of the motor in the wrong direction is impossible.

Other features which are considered as characteristic for the invention are set forth in the appended claims.

Although the invention is illustrated and described herein as embodied in particular examples of motorized control rod drives, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing, in which.

Figure 1:
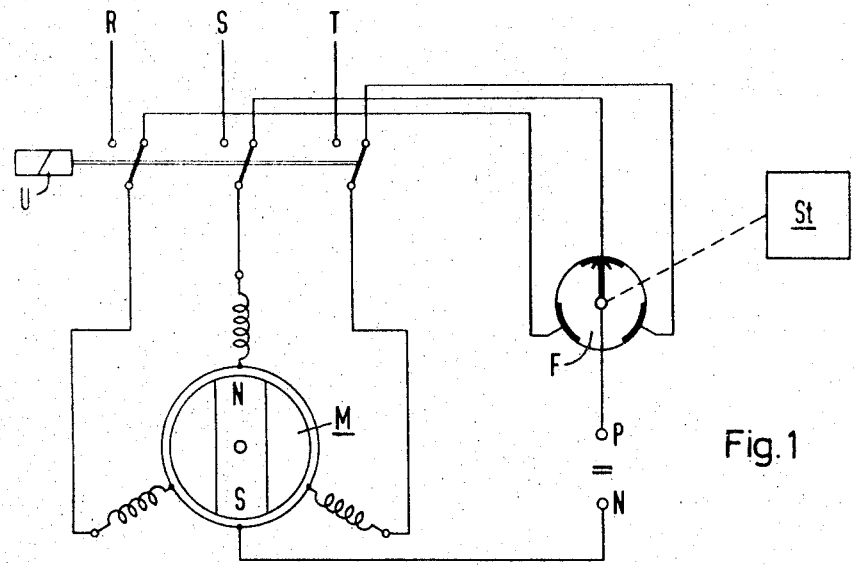
FIG. 1 is a schematic diagram of the reactor control-rod drive of my invention and of the means for selectively connecting the same to a three-phase alternating current source and to a direct current source.

Referring now to the drawing and first particularly to FIG. 1 thereof, there is shown schematically a conventional synchronous motor M having a rotor with a north pole N and a south pole S. Synchronous motors of this general type correspond in outer appearance to conventional synchronous motors, while the stator thereof has a conventional multiphase winding. The rotor, besides having a squirrel-cage winding for start-up, has unidirectional field excitation means which in this case are formed by a permanent magnet. When the stator windings are supplied with multiphase alternating current, the rotary speed of the motor will then adjust in synchronism to the alternating-current frequency. If the stator pole windings are sequentially excited by direct current, however, the rotor will continually perform angular rotation until the stator direct flux and the unidirectional or permanent-magnet flux of the rotor are optimally interlinked. The rotary speed of the motor can thus be adjusted by the direction and the switching frequency of the direct current excitation of the stator pole windings which are circumferentially spaced 120° from one another. If one stator pole winding remains excited by direct current, no switching takes place to the other windings and the motor armature remains in this position. A magnetic rest or stopping moment is thereby attained which is somewhat similar to the nominal or rated moment of the motor and obviates the necessity for any mechanical braking device. The adjustment accuracy attainable with such a motor is given by the size of the individual attainable angular steps. This size of the angular steps is dependent upon the number of stator pole windings; the greater the number, the smaller the individual angular steps i.e. the more accurately a nuclear reactor control rod can be positioned. Obviously, such a diminution of the individual angular steps can be achieved also by a suitable transmission system.

It is noted for example when employing a six-pole stator winding and a spindle nut for the movement of the driven spindle and therewith the control rod, an adjustment time of 6 sec. is needed for a lifting stroke of 900 mm when energized with a rotating or multiphase current with a rate of lift of 9 mm per rotation. For direct current supply of the motor, the smallest reproducible angular step of the motor is 20° which corresponds to a lift stroke of 0.5 mm which is 0.55 percent of the total distance to be lifted. This accuracy is independent of the switching frequency.

As can be seen further in FIG. 1 of the drawings, the multiphase stator winding can selectively be connected by the switch U to a multiphase current system or source RST or to a direct current source N-P. The switching of the direct current excitation from one winding to another one of the stator pole windings is effected by a switch F actuated by a control device St, which also then determines the rotary direction of the motor which, with this form of excitation, is a step motor.

Figure 2:
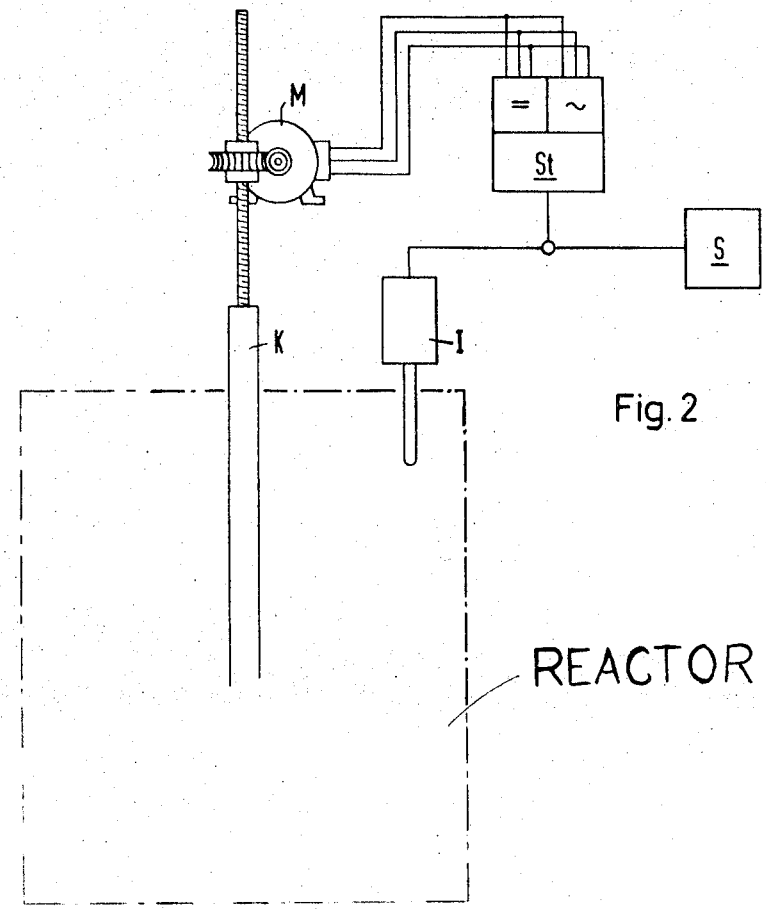
FIG. 2 is a schematic diagram of the motor and connecting means of FIG. 1 as connected in a control circuit of a nuclear reactor plant.

In the schematic view of FIG. 2 there is shown a control rod K having a threaded rod extending from the upper end thereof. The threaded rod is suitably threaded in a nut provided with a transmission gear engaging in corresponding transmission gear driven by the motor M. In a conventional manner, as the motor M rotates, the mutual transmission system will cause the nut to rotate and to thereby elevate or lower the control rod K.

An actual or measured value is provided by a conventional transmitting device I such as a transducer which determines, for example, the radiation within a reactor core represented by the broken lines. The values measured by the device I are compared with a nominal value transmitter S' and suitably actuate the control device St so that the latter effects a time-limited switching-on of the motor either with multiphase excitation or with direct current excitation, the switching frequency for the pole windings being adjusted in dependence upon the size of the control signals, preferably automatically. The switching-on of the multi-phase rotary current excitation can be effected for normal control operations through limit value transmitters adjusted to relatively large control signals. The electrical circuitry therefor is relatively simple and so well known to a man of ordinary skill in the art that it is believed to be unnecessary to further describe the same in greater detail.

The mechanical switching device F shown in FIG. 1 can also be replaced, obviously, by a contact-less switching device which for example operates with sawtooth stages (a ring counter) and the stepping frequencies thereof are controllable purely electrically in a conventional manner. This also applies to the contactor R in the system of FIG. 3 described presently.

Figure 3:
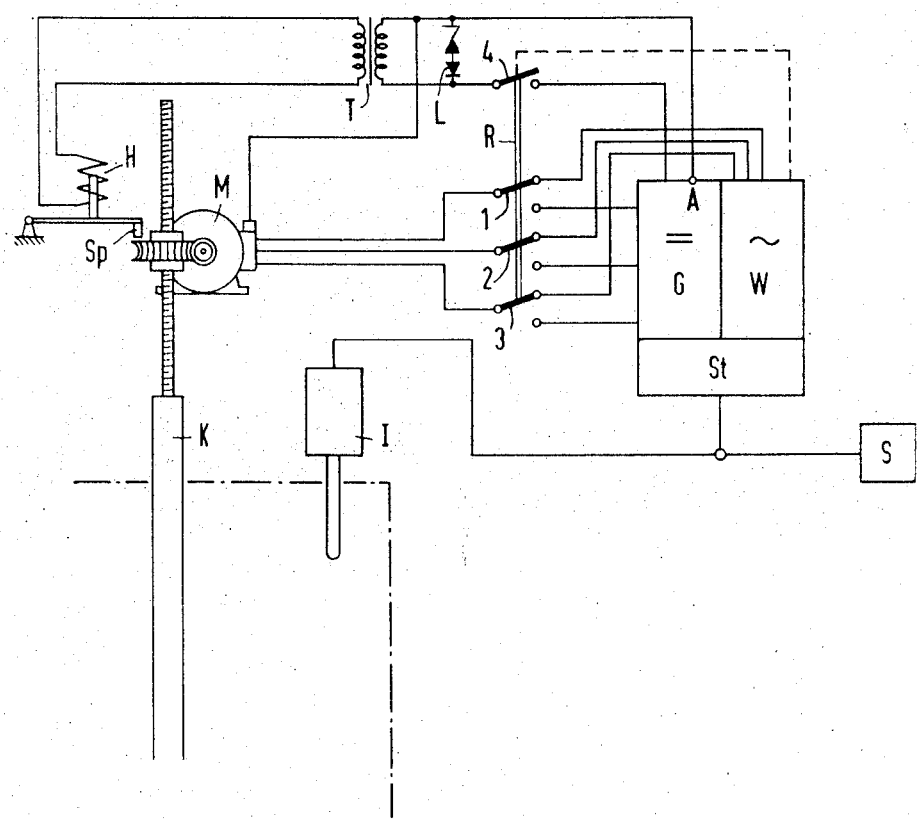
FIG. 3 exemplifies another embodiment of a control-rod drive according to the invention which is equipped with an automatic blocking device for preventing rapid pull-out of the control rods.

In FIG. 3 the same reference characters are used as in FIGS. 1 and 2 for designating corresponding components respectively.

As to its fundamental design and functioning, the drive system of FIG. 3 corresponds to the system described above with reference to FIGS. 1 and 2. In addition, the system of FIG. 3 is provided with a blocking stop or detent Sp which normally engages the motor-driven gear that forms part of the threaded nut engaging the drive spindle of the control rod K. The blocking detent Sp is normally biased into blocking engagement with the gear and acts as a stop in only one rotational direction of the gear. The biasing force may be secured by means of a spring, although in the illustrated embodiment the bias is assumed to be due to gravity.

Whenever the detent Sp is lifted by an electromagnet H, it releases the drive for upward travel of the control rod K. The control device St which controls the excitation of the motor M in response to error or deviation signals coming from the measured-value transmitter or sensor I on the one hand and from the datum or reference value transmitter S on the other hand, is provided with a direct current source G and an alternating current source W. These two sources are selectively connected by the main contacts 1, 2, 3 of a contactor R with the stator windings of the motor M. An auxiliary contact 4 of contactor R is connected in a direct current line which feeds the pulse transformer T from a separate output A terminal of the direct current source G. The contact 4 is closed only when the motor M is excited by direct current. The pulse passing from terminal A of direct current source G through contact 4 of the contactor R to the pulse transformer 4 and thence to the electromagnet H is formed within the direct current source G at the beginning of each upward step of operation. The control device St, depending upon the desired stepping direction of the motor M, passes pulses onto one of the two pulse inputs of direct current source G. In the simplest case of operation, each of these pulses entering into the pulse input of source G that corresponds to the upward movement of the rod, is imposed directly or through an interposed pulse-duration limiting member L of conventional design, to the terminal A and thus effects the desired temporary excitation of the magnet H. In the illustrated embodiment the member L is a series connection of a zener diode and a rectifier diode connected in parallel to the primary winding of the pulse transformer T.

When the motor M is energized by three-phase current, the contact 4 of contactor R is open, as illustrated. This prevents the pulse transformer T and consequently the electromagnet H from being excited. With the correct connection of the phases to motor M there results a downward travel of the control rod K, and the blocking detents of the respective rods are not in active engagement. However, if a phase exchange has occurred, the detents are active and prevent the reverse rotation of the nut and thereby an outward travel of the control rods.

The interposition of the pulse transformer T constitutes a preferred improvement of the system according to the invention because it increases the safety of the equipment in the event of any fault occurring in the electronic control device G, St. If on account of such a fault, a direct voltage is constantly applied to the primary winding of the pulse transformer T, the transformer becomes magnetically saturated, and the blocking detent Sp will again enter into blocking engagement because the saturation prevents any further voltage from being transmitted to the electromagnet H. Such a fault, consequently, acts toward increase reliability and safety, which is particularly important for the operation of nuclear reactors.

A further improvement of the system according to the invention is obtainable by permitting an increase in switching frequency if any of the conventional components for rapid de-magnetization of the pulse transformer T and/or the electromagnet H are added, such as the above-described member L in FIG. 3.

While the blocking detent or pawl mechanism is shown engageable with a gear structure that forms part of the threaded nut, it may also be located at a different place, for example so as to act directly upon the shaft of motor M. The detent system, as explained, affords the security that only the desired downward travel of the regulator rods is possible. The requirements to be met with respect to safety are thus fully satisfied.

I claim:

1. Motorized variable speed drive for nuclear reactor control rod, comprising a synchronous motor having a rotor with unidirectional field excitation means and having stator windings, multiphase current supply means and direct current supply means, means for selectively connecting said stator wind-ings to said multiphase supply means for relatively rapidly moving the control rod and to said direct current supply means for stepwise and relatively slowly moving the control rod, said stator windings being connectible to the direct current supply means by said connecting means in a selective sequence and direction and at a selective winding-switching frequency, a blocking detent device blockingly engageable with the drive to then prevent inadvertent upward travel of the control rods, said device having electromagnetic release control means connected to said selective connecting means and controllable thereby to temporarily disengage said device with each switching of current from said direct current supply means by said connecting means, and a magnetically saturable pulse transformer interposed between said electromagnetic release control means and said selective connecting means for passing to said release control means a short pulse to effect the temporary disengagement of said detent device.

2. In a control rod drive according to claim 1, said selective connecting means comprising a contactor having an auxiliary contact closed only when said contactor connects said stator windings of said motor to said direct current supply means, said pulse transformer being connected to said direct current supply means under control by the closing of said auxiliary contact to then pass a pulse to said electromagnetic release control means.

3. A control rod drive according to claim 1, comprising circuit means connected to at least one of said transformer and said electromagnetic means for promoting rapid discharge thereof.

* * * * *